Feb. 26, 1957   H. CAHN   2,783,445
TEST CLIP
Filed Sept. 25, 1953
FIG. I
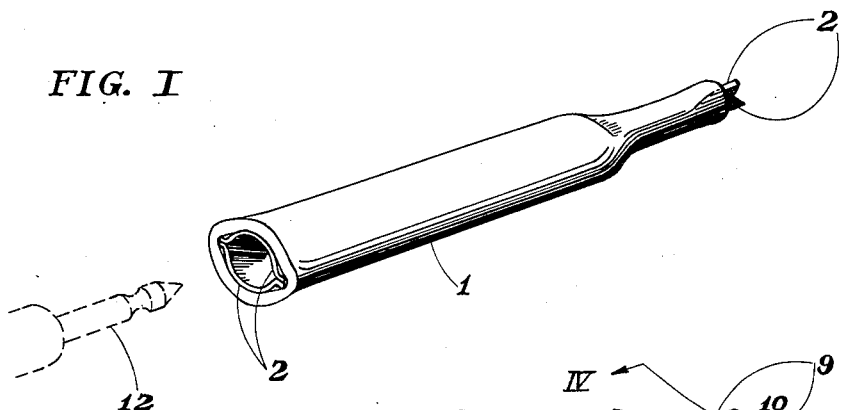
FIG. II
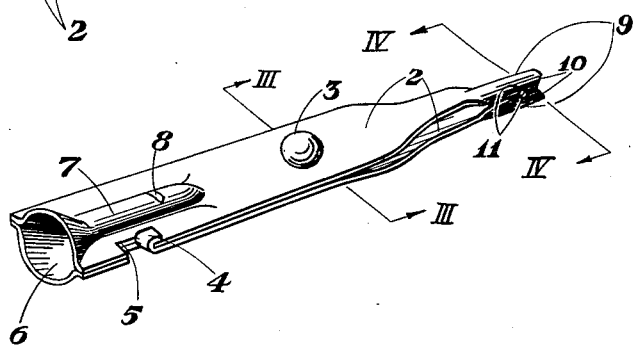
FIG. III
FIG. IV
Herbert Cahn

United States Patent Office 2,783,445
Patented Feb. 26, 1957

2,783,445

TEST CLIP

Herbert Cahn, Asbury Park, N. J.

Application September 25, 1953, Serial No. 382,487

1 Claim. (Cl. 339—262)

(Granted under Title 35, U. S. Code (1952), sec. 266)

The invention described herein may be manufactured and used by or for the Government for governmental purposes, without the payment of any royalty thereon.

This invention relates to new and useful connecting devices for investigation and testing of electric circuits, and has for its principal object the provision of improved, safe, reliable, inexpensive and convenient test clip connecting devices for gaining access to conductive elements of electric circuits, by attachment between test probes which are commonly used as terminations of test instruments, and points in electric circuits under investigation and test.

The invention aims to provide a test clip connecting device which is capable of being attached and mechanically locked to, as well as of being detached from test probes with extreme convenience, and with assurance of perfect electrical connection to such probes when attached.

Furthermore, the invention aims to provide for convenient attachment of test probes to wires and other conductive elements in electric circuits, particularly in such circuits as those of compactly constructed radio sets, hearing aids, etc. where accessibility to circuit points is ordinarily difficult because of close spacing between the various parts comprising the radio sets, hearing aids, etc., such convenient attachment being made possible by the adaptability of the invention to slender construction with complete electrical insulation on its exterior surface.

Furthermore, the invention lends itself to construction in a form which will be simple and inexpensive to manufacture, yet will have improved functional properties over those previously suggested and made for a similar or related purpose.

Furthermore, the invention, by virtue of its simplicity, provides ruggedness, durability and reliability in a smaller and more easily manipulated form than devices heretofore known. Atttachment to a test probe is accomplished by manually inserting the probe tip into the spring receptacle portion of the test clip. Connection to an electric circuit point under investigation is thence made by manually grasping the test probe handle and pushing the tip of the attached test clip against the circuit point, thereby forcing open the jaws of the test clip, which grasp and hold to the circuit point. Removal of the test clip from the circuit point which has been investigated is accomplished by retracting the probe handle manually, thereby releasing the grip of the jaws from the circuit point, while the test clip conveniently remains firmly connected to the test probe.

These and other objects of the invention will be more apparent from the following description and claims.

The invention will be more fully understood from the drawings in which Figure I is a perspective view of the invention alongside a perspective view of a cutaway mating end of a cooperating test probe tip. Figure II is a perspective view of the invention with insulating sleeve 1 removed to show the form of metal parts housed inside the sleeve, Figure III is a transverse sectional view of the invention taken on the line III—III in Figure II, and Figure IV is a transverse sectional view taken on the line IV—IV in Figure II.

An insulating sleeve 1 in the form shown is a close fitting elastic molded rubber tubular sleeve, open at both ends exposing the ends of an assembly of two strips of spring metal 2, the first of said exposed ends being a tapered entrance hole 6 for insertion of typical cooperating test probe tip 12 shown in line with said hole 6 ready for insertion, and the remaining exposed end being the tips 10 of a pair of jaws 9 for gripping electric circuit points under investigation. Said strips 2 are permanently secured in close longitudinal contact with each other by rivet 3 and tab 4, rivet 3 being located perpendicular to and through the approximate centers of strips 2, and tab 4 formed of part of the first strip 2 being crimped through cut out notch 5 in the remaining strip 2 and firmly back on itself to provide a second point of security between strips 2.

Said strips 2 are in the form of spring tempered metal of high electrical conductivity, being cut and shaped, in the form shown, prior to fastening by said rivet 3 and said tab 4, to function at one extremity as a spring receptacle for mating with cooperating test probes, and at the remaining extremity as a pair of spring jaws 9 for gripping electric circuit points.

One extremity of the assembly of said strips 2, forming a spring receptacle for cooperating test probes, in the form shown, is a longitudinal tubular channel 7 with tapered entrance opening 6 to facilitate the insertion of cooperating test probes, and dimples 8 to lock into and hold against mating depressions in inserted cooperating test probes, to be retained in relatively secure attachment to said test probes during the course of normal manipulation of said probes.

The remaining extremity of the assembly of said strips 2, forming said spring jaws 9, in the form shown is a narrowed portion of said strips 2, having tips 10 of said jaws 9 beveled and forming an entrance tapering outward toward the extremities of said jaws 9 for facilitating attachment of said jaws 9 to wires, contact lugs, and various other points to be investigated in electric circuits of radio sets, hearing aids, etc., and having notches 11 in the mating inner surfaces of said jaws 9, for gripping and retaining electrical contact to points in electric circuits under investigation, without the necessity of being hand held after being attached to said points.

In the form shown, the holding force of the spring receptacle of the test clip when attached to a cooperating test probe, is sufficiently greater than the holding force of spring jaws 9 attached to a point in a circuit under investigation, to assure that the jaws are capable of being detached from such point in a circuit by manual withdrawal of the test probe, while the test clip remains attached to the test probe. Attachment of the test clip to a cooperating test probe thus makes said test clip effectively a functional part of said probe when attached thereto, the function being to enable an operator of said probe to attach and detach said probe repeatedly to and from various points in circuits under investigation, said test clip jaws 9 gripping and physically supporting both said test clip and cooperating probe to allow freedom from manual support, as may be required.

In the form illustrated it will be seen that the invention will function as a connecting device to receive and hold fast to the tip of a test probe in semi-permanent mechanical and electrical attachment, enabling said probe to be manually attached to and detached from points in electrical circuits under investigation.

Such connecting devices are capable of adapting the usual probes of testing instruments, etc. for manual attachment to and detachment from points in electrical circuits, with great convenience, such attachment and detachment being accomplished simply by manually inserting a cooperating probe into the receptacle of the connecting device, thence grasping the assembly of probe and connecting device by the probe handle, placing the tips of the jaws of the connecting device against a wire, lug, etc. which is contained in an electric circuit, and pushing the probe handle longitudinally to force the jaws of the connecting device over the wire, lug, etc. thereby gripping securely thereto, and leaving the hands of the operator free. Conversely, detachment is accomplished by grasping the probe handle and retracting longitudinally to release the grip of the spring jaws of the connecting device from their point of attachment in an electric circuit.

Such connecting devices because of their slender insulated form are capable, when in use, of providing a high degree of electrical isolation from surrounding nearby electrically conductive elements, such isolation being extremely desirable during investigation of highly compact and congested electrical circuitry commonly encountered in radio sets, hearing aids, etc.

Although no prior art or invention offering functional equivalence is in evidence, economic advantage over known types of test clips is derived from the very nature of the mechanical structure of the test clip, consisting of two substantially symmetrical and simply shaped metal strip members fastened together, and sheathed within an elastic insulating sleeve of simple form.

While many variations in size or in arrangement and details may be made, without departing from the spirit of this invention, what is claimed and desired to secure by Letters Patent is:

An electrical connecting device consisting of an electrical insulating sleeve enclosing an assembly of a pair of electrically conductive spring strip members centrally fastened in parallel juxtaposition having their respectively juxtaposed ends free to be sprung into divergence, the first pair of said ends being shaped to form a bore with an indentation in the wall of said bore to receive and hold fast to cooperating electrical probing devices having a pin shaped probing tip with a peripheral groove and a tapered point, said groove being so located as to receive to mate with said indentation in said bore, the remaining pair of said ends flaring outward and free to be sprung into divergence, their inner mating surfaces serrated to grip various physical forms of conductive parts in electric circuits, said first ends having sufficiently greater holding force upon cooperating probing devices when mated thereto than said remaining ends have of gripping force upon various physical forms of parts in electric circuits, said device effecting the conversion of probing types of test prod terminations into gripping jaw types.

References Cited in the file of this patent
UNITED STATES PATENTS

| | | |
|---|---|---|
| 411,093 | Coughlin | Sept. 17, 1889 |
| 465,430 | Desant | Dec. 15, 1891 |
| 918,617 | Walsh | Apr. 20, 1909 |
| 1,531,049 | Thompson | Mar. 24, 1925 |
| 1,869,181 | Beck | July 26, 1932 |
| 2,110,197 | Brownstein | Mar. 8, 1938 |
| 2,156,319 | Steele | May 2, 1939 |
| 2,204,408 | Folsom | June 11, 1940 |
| 2,574,043 | Lannon | Nov. 6, 1951 |
| 2,648,826 | Jubenville | Aug. 11, 1953 |
| 2,706,283 | Cahn | Apr. 12, 1955 |